United States Patent [19]

Altman et al.

[11] 4,121,234
[45] Oct. 17, 1978

[54] FOCUSING AND PROJECTION SCREEN

[75] Inventors: Richard M. Altman, Woodland Hills; Thomas D. McLaughlin, Thousand Oaks, both of Calif.

[73] Assignee: Vivitar Corporation, Santa Monica, Calif.

[21] Appl. No.: 784,711

[22] Filed: Apr. 5, 1977

Related U.S. Application Data

[63] Continuation of Ser. No. 606,350, Aug. 21, 1975, abandoned.

[51] Int. Cl.² ............... G03B 13/02; G03B 19/12; G02B 5/14
[52] U.S. Cl. .................. 354/201; 350/96.27; 354/155
[58] Field of Search ............ 354/150–155, 354/200, 201, 219, 53, 54; 352/94; 350/117, 127, 128, 96 BC, 126

[56] References Cited

U.S. PATENT DOCUMENTS

| | | | |
|---|---|---|---|
| 2,213,077 | 8/1940 | Schwartz | 350/126 |
| 2,323,754 | 7/1943 | Oliver | 350/128 X |
| 3,182,576 | 5/1965 | Papke | 354/155 |
| 3,253,500 | 5/1966 | Hicks | 350/96 BC |
| 3,274,912 | 9/1966 | Kasahara | 354/201 X |
| 3,498,198 | 3/1970 | Fujii | 354/155 UX |
| 3,502,389 | 3/1970 | Hilborn | 350/128 X |
| 3,574,582 | 4/1971 | Siegmund et al. | 350/96 BC |
| 3,661,065 | 5/1972 | Yamazaki et al. | 354/201 |
| 3,703,660 | 11/1972 | Fyler | 350/96 BC X |
| 3,797,910 | 3/1974 | Westwig | 350/96 BC |
| 3,913,872 | 10/1975 | Weber | 355/67 X |

FOREIGN PATENT DOCUMENTS

| | | | |
|---|---|---|---|
| 188,751 | 11/1922 | United Kingdom | 350/117 |
| 675,925 | 7/1952 | United Kingdom | 350/117 |

Primary Examiner—Donald A. Griffin
Attorney, Agent, or Firm—DeLio and Montgomery

[57] ABSTRACT

An optica image forming screen which comprises a multiplicity of light-transmitting elements in a matrix of light-absorbing elements so that light incident upon the elements at an angle greater than a predetermined angle will be internally absorbed by the elements, with no significant reflection internal to the elements and with element size conducive to a scattering effect by using diffraction in the image space.

15 Claims, 6 Drawing Figures

FOCUSING AND PROJECTION SCREEN

This is a continuation of application Ser. No. 606,350 filed Aug. 21, 1975 and now abandoned.

Cameras of the single lens reflex type and also of the range finder type generally include a focusing system utilizing either a microprism or image splitting prisms in the viewing and focusing system.

The microprism system in a single lens reflex camera includes a pattern of a multiplicity of prisms set in a focusing and viewing screen. The focusing screen is positioned between the exit pupil of the lens and the viewing system usually at or near the image plane. When the object is in focus through the objective lens, it will appear in sharp detail, and the individual prisms are barely discernible.

However, as the relative aperture (diameter of entrance pupil) of the lens is decreased, the microprisms appear as a multiplicity of dark spots, become larger darker areas with increasing F number, and focusing becomes more difficult. This may be alleviated by focusing at full aperture on relatively wide aperture lenses, and then stopping down to the desired aperture setting. However, where auxiliary lenses are utilized with smaller maximum relative apertures, for example $f/4.0$ and larger, the amount of light is restricted, and the aforementioned problem of dark microprism is again presented. The user usually then must rely on the remainder of the ground glass or fresnel lens outside of the microprism for focusing.

A similar problem is presented in split image type focusing devices; however, here the problem is evidenced by one portion of the split image appearing dark.

The present invention provides a new and improved focusing arrangement which permits focusing over a wide range of relative apertures.

Briefly stated, the invention in one form thereof as utilized in a single lens reflex type camera comprises a light scattering screen and fresnel lens member having a smaller focusing screen disposed therein. The focusing screen comprises a plurality of optical elements of high light transmissivity in a matrix with each element surrounded by a light absorbing glass of essentially the same refractive index material. Thus light rays of large angles of incidence are absorbed and do not pass through the optical elements. Conversely, only light rays of small angles of incidence efficiently pass through. Thus the focusing element, regardless of lens aperture, passes essentially only the light available at smaller aperture regardless of aperture opening.

An object of this invention is to provide a new and improved screen for displaying an optically formed image.

Another object of this invention is to provide a new and improved camera focusing screen.

Another object of this invention is to provide a focusing screen whose brightness is not adversely effected by small lens relative aperture.

A further object of this invention is to provide a new and improved focusing arrangement for cameras particularly those of the single lens reflex type.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

Figure 1:
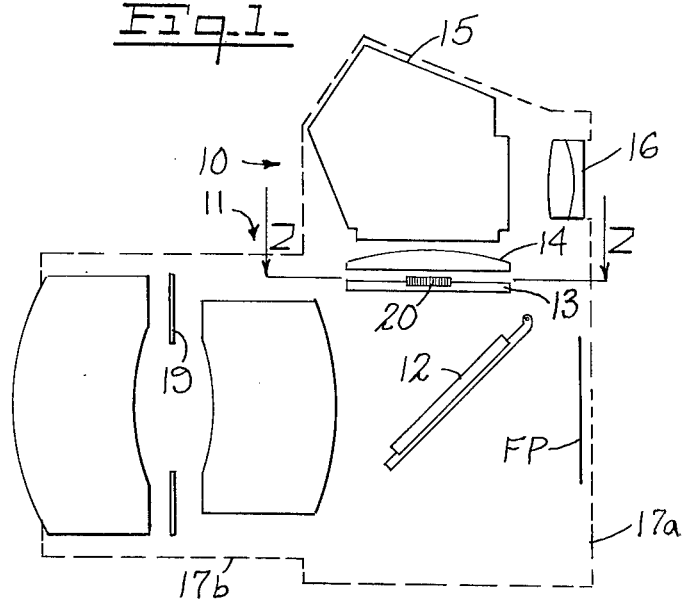
FIG. 1 is a representation of the side elevation of a single lens reflex camera including a focusing screen embodying the invention.
Figure 2:
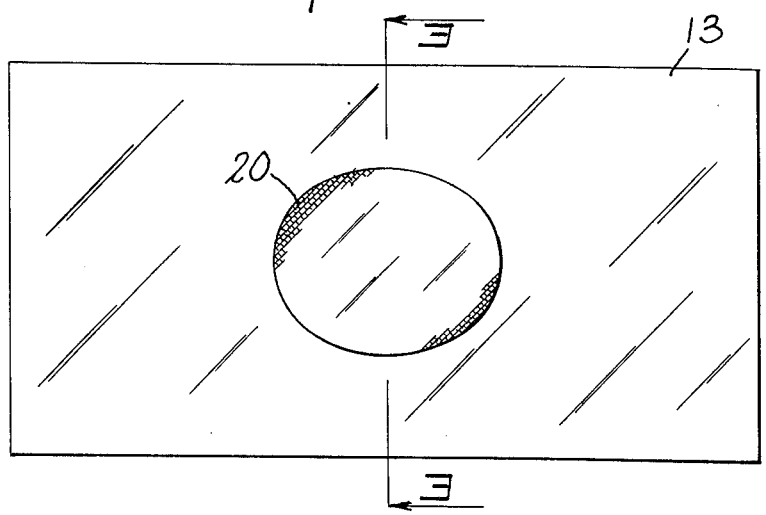
FIG. 2 is a view of the focusing screen seen in the plane of lines 2—2 of FIG. 1.

A single lens reflex camera 10 as shown in FIG. 1 includes an objective lens 11, a pivotal mirror 12, a viewing and focusing screen 13, a field lens 14, a prism 15, and a viewing lens 16. The camera body is represented in broken line 17a and the lens housing by the broken line 17b. The objective lens is disposed in lens housing 17 and is movable axially for focusing by any conventional mechanism. Lens 11 has an adjustable aperture defining means 19.

The focusing screen 13 is disposed the same optical distance from the exit pupil of lens 11 as the image or film plane FP, so that an image of an object is formed on screen 13.

Screen 13 conventionally is ground glass or a plastic equivalent thereof, with a fresnel lens, and usually with a central microprism.

In the present invention, however, screen 13 is provided with a new and improved focusing screen 20. As shown, screen 13 is formed with a central recess 21 which receives the focusing screen 20 therein.

Screen 20 is a plate-like member comprised of a multiplicity of optical elements 22 of high light transmissivity, each surrounded by a light-absorbing material or cladding 23. In essence, the light-absorbing material is a matrix with the multiplicity of optical elements therein. The individual elements are preferably rectangular, hexagonal, or otherwise formed polygonal with flat sides to permit a more concentrated number of elements per unit area. However, the elements may be circular in cross section. The material of the matrix is preferably glass where the elements 22 are glass.

Figure 5:
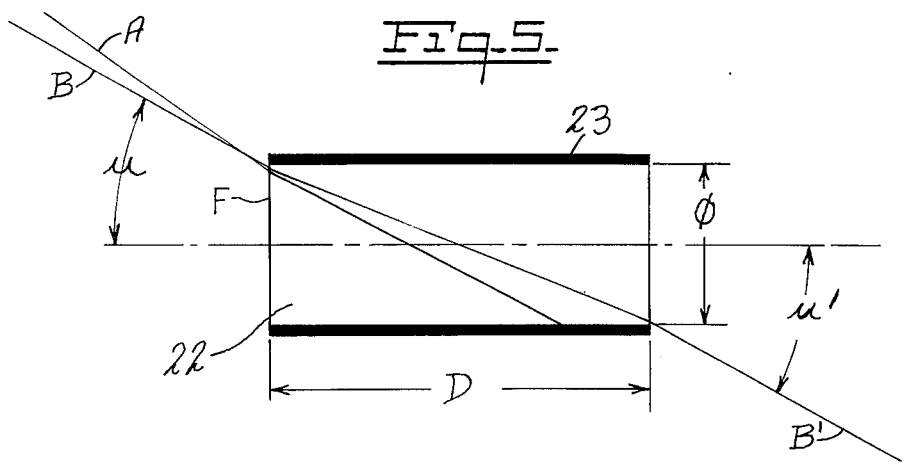
FIG. 5 is a longitudinal view of one element of the focusing screen.

Reference is now made to FIG. 5 which exemplifies one element 22 of screen 20. The element 22 may be considered a tube or tunnel of transparent glass having a length D and a non-reflective and light-absorbing cladding 23 thereabout of essentially the same index of refraction as the transparent tube.

The diameter $\phi$ or major cross-sectional dimension between opposed surfaces is $$\phi \geqq \lambda/(n \sin u) \tag{1}$$

where
  $\lambda$ is the wave length of light in the optical spectrum of the light to be viewed and for visible viewing is substantially 400–700 nanometers,
  $n$ is the index of refraction,
  $u$ is the half angle of the widest bundle of light rays capable of entering the element.

Where, the screen is designed for use with a lens which is not diffraction limited the equation becomes $$\phi \geq (q\lambda)/(n \sin u) \quad (2)$$

where $q$ is the ratio of diameter of the useful light of an aberrated image of a point source to the effective Airy Disc diameter both defined in the image plane by an objective and $50 \geq q \geq 1$.

As stated in Military Standard Optical Terms and Definitions, MIL-STD-1241A, Mar. 31, 1967, Page 17, "When light from a point source passes through a circular or annular aperture, and is brought to a focus by means of a lens, the image so formed is not a point, but owing to diffraction by the aperture, is a bright central disc of light surrounded by a series of progressively fainter rings. The central disc is called the Airy Disc by some authorities; others prefer to apply the term to the entire diffraction pattern".

The foregoing value $q$ is a lens quality factor dependent on the objective. The effective diameter of the Airy Disc is $2\lambda/2n \sin u$, where $n$ and $\sin u$ are determined by the lens. The effective diameter is slightly smaller than the actual diameter of the bright central disc. Where the lens is diffraction limited $q = 1$, and disappears from equation (2).

The diameter $\phi$ may also be expressed as $$\phi = (\lambda/u') \text{ (radians)} \quad (3)$$

It is to be understood that the foregoing equation is valid for infra red and any other invisible light, and a screen constructed therefor.

The length D of each tube (FIG. 5) is equal to or less than the range or depth of focus (FR) of the objective and may be espressed as $$D \leq FR \quad (4)$$

where $$FR = \frac{\lambda}{N \sin^2 u} = \frac{n\lambda}{NA^2} \quad (5)$$

where $\overline{NA}$ is the smallest numerical aperture of the objective, which gives the longest range of focus.

The numerical aperture is equal to 0.5 divided by the relative aperture of the lens (f-number).

Where the element is polygonal in cross-section, $\phi$ is the dimension across opposed flat surfaces.

Due to the absorbing properties of the base material, the cross-sectional area of the elements and the high light transmissivity of the glass, the light transmitted through the elements is sufficient for focusing from relative apertures of $f/0.9$ to $f/30$ of the objective.

Any light entering surface F of an element 22 at an angle greater than the angle $u$ will, as represented by the ray A, strike cladding 23 and be absorbed. Light rays entering surface F at an angle $u$ or smaller will exit the element and be transmitted as exemplified by the ray B-B'.

When the lens is not focused such that the screen elements include the depth of focus, the image becomes dark due to absorption of light, and resultant decrease in light transmitted therethrough. As the lens is focused and the depth of focus brought within the length D of the screen 20, the image appears to sharply snap into focus and brilliant view.

Each element 22 contains an image of an incremental portion of the object. The light entering the elements 22, in essence, fills the small volume of each tube. In focusing, the viewer is essentially focusing on a volume rather than a plane. The focused image appears between the ends of each element.

One embodiment of the invention has been constructed of glass rods with absorptive glass claddings drawn down in rectangular cross-section to a density of one million elements per square inch in a generally oval rod of about $\frac{3}{8} \times \frac{1}{2}$ inch dimension. Then individual screens 20 were cut from the rod.

The index of refraction of the glass 22 is preferably high to maximize the thickness of screen for production and handling purposes.

The edge dimension of each element 22 was about 0.001 inch, excluding the adjacent portion of light absorbing material 23 which was about 0.0001 inch. The glass had a transmission loss of less than 1% per inch of length.

Figure 3:
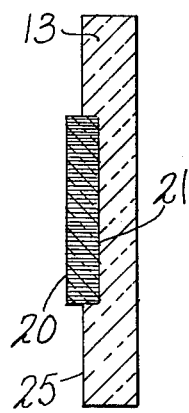
FIG. 3 is a sectional view seen in the plane of lines 3—3 of FIG. 2.
Figure 4:
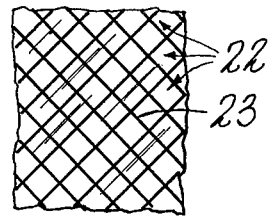
FIG. 4 is a greatly enlarged view of a portion of the focusing screen.

It will be appreciated that the entire screen 13 of FIGS. 1–4 could be formed in the manner described for screen 20. As shown in FIG. 3 the surfaces of screen 20 reside on either side of surface 25 of screen 13. With this construction, an image formed in screen 20 will also appear in focus at surface 25. Surface 25 is ground glass or a plastic equivalent thereof.

Due to the fineness of the matrix the scattering of light due to diffraction effects is substantially more efficient than a ground focusing surface 25 or equivalent thereof in forming a bright image.

It is believed that the apparent increase in brightness in a screen 20 in comparison to the surrounding screen is due to this diffraction effect.

Figure 6:
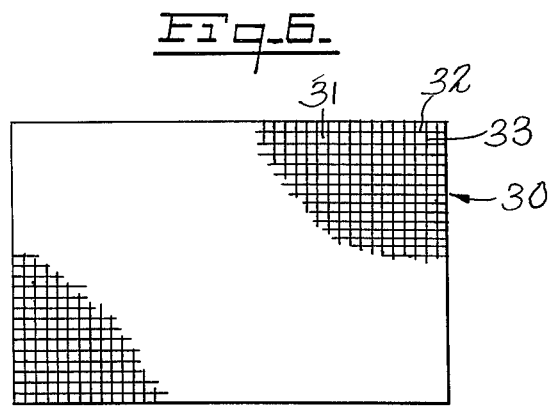
FIG. 6 is a view of another screen embodying the invention.

Because of this diffraction effect, a screen 30 (FIG. 6) can be provided utilizing a very fine mesh screen or honeycomb without glass, and the image formed in the air elements 31 between the grids 32 and 33 of the matrix. Such screen as represented in FIG. 6 would be electroplated with optical black chrome so that there would be no reflected light in a tube or tunnel, and rays at large angles of incidence absorbed.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A screen adapted to be mounted in the optical viewing path of a camera with through the lens viewing where the lens is focusable to create an image of an object in a depth of focus, said screen comprising a multiplicity of light transmitting elements essentially uniformly arranged and closely spaced together, each element surrounded by a light absorbing material, the length (D) of each element being equal to or less than $\lambda/\overline{NA}^2$, the major cross-sectional dimension ($\phi$) across each element being equal to or less than $\lambda/n \sin u$ where $\lambda$ is the wavelength of light in the optical spectrum of the light entering the lens, $n$ is the index of refraction of the material of the element, $u$ is the half angle of the largest bundle of light rays which can be transmitted through each element, and $\overline{NA}$ is the smallest numerical aperture of the lens
so that when the lens is not focused to include the elements in the depth of focus the screen darkens due to absorption of light by said light absorbing material and as the lens is focused to bring its depth of focus within the length of the screen an image formed by the lens appears to sharply come into focus and be brightly illuminated on the screen.

2. The screen of claim 1 wherein the elements are glass and the light absorbing material is glass of essentially the same refractory index as said elements.

3. The screen of claim 1 further including a larger screen having a recess therein behind an image-viewing surface, said screen disposed in said recess of said larger screen with the front and back surfaces thereof on opposite sides of said image-viewing surface.

4. The screen of claim 1 wherein said elements are air.

5. The screen of claim 1 in combination with a single lens reflex camera having an objective lens defining an exit pupil, means defining a film plane, and a viewing system, said screen positioned in said viewing system so that the front and rear surfaces thereof subtend a plane that is the same distance from the exit pupil of the lens as the defined film plane.

6. The screen of claim 1 further including a larger screen having a recess therein behind an image viewing surface, said screen disposed in said recess of said larger screen with the front and back surfaces thereof on opposite sides of said image viewing surface.

7. In a camera of the type arranged to mount interchangeable lens where the lens is focusable to create an image of an object in a depth of focus, means defining a focal plane, and a viewing system including a focusing screen subtending a plane that is the same distance from the exit pupil of a lens as the focal plane and is a continuation of the optical axis of the lens; said focusing screen comprising a multiplicity of light transmitting elements of finite length essentially uniformly arranged and closely spaced together, each element surrounded by a light absorbing and non-light transmissive material, said elements being of a length which resides within the focal range of a lens mounted to the camera and of a predetermined cross-sectional shape and dimension whereby only light of a predetermined angle of incidence or less is passed by said elements so that when the lens is focused such that its focus range includes the elements of said screen an image from said lens comes into sharp focus and bright illumination on said screen.

8. The camera of claim 7 wherein the length (D) of the light transmissive elements along the optical axis is given by $$D \leq (\lambda/\overline{NA}^2$$

where $\lambda$ is the wavelength of light in the optical spectrum of the light to be viewed and $\overline{NA}$ is the smallest numerical aperture of the lens.

9. The camera of claim 7 where each element has a major cross-sectional dimension $\phi$ and $$\phi \geq \lambda/(n \sin u)$$

where
$\lambda$ is the wavelength of light in the optical spectrum of the light to be viewed,
$n$ is the index of refraction of the material of the element,
$u$ is the half angle of the largest bundle of light rays which can be transmitted through each element.

10. The camera of claim 7 wherein the elements are glass and the light absorbing material is glass of essentially the same refractory index as said elements.

11. The camera of claim 7 further including a larger second screen having a recess therein behind an image-viewing surface, said screen disposed in said recess of said larger second screen with the front and back surfaces thereof on opposite sides of said image-viewing surface.

12. The screen of claim 7 further including a larger screen having a recess therein behind an image viewing surface, said screen disposed in said recess of said larger screen with the front and back surfaces thereof on opposite sides of said image viewing surface.

13. The camera of claim 7 where said elements have a length in said screen D and a major cross-sectional dimension $\phi$ and $$D \leq FR,$$

and $$\phi \geq \lambda/(n \sin u)$$

where
$FR$ is the maximum depth of focus of the lens,
$\lambda$ is the wavelength of light in the optical spectrum of the light to be viewed,
$n$ is the index of refraction of the material of the elements,
$u$ is the half angle of the largest bundle of light rays which can be transmitted through each element.

14. The combination of claim 13 wherein said elements ae glass, and the light-absorbing material is glass of the same index of refraction.

15. The screen of claim 13 wherein said elements are air.

* * * * *